3,191,417
APPARATUS FOR SHAPING HOLLOW MEMBERS
Václav Adam, Semily, Czechoslovakia, assignor to Vyzkumny a zkusebni letecky ustav, Letnany, Czechoslovakia
Filed Aug. 22, 1963, Ser. No. 303,862
Claims priority, application Czechoslovakia, Sept. 4, 1962, Pv 5,108/62
8 Claims. (Cl. 72—126)

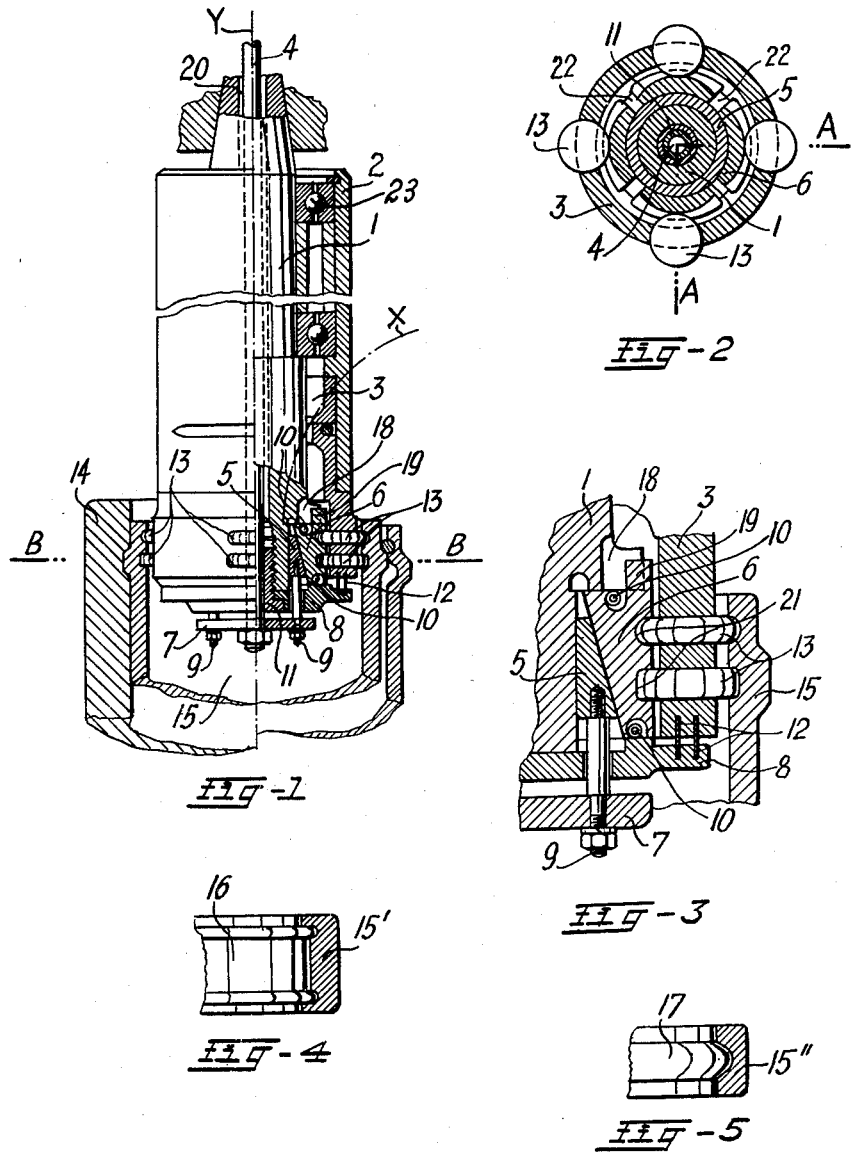

The present invention relates to the shaping of hollow cylindrical bodies, and particularly to the forming of grooves in the internal walls of such bodies by radial displacement of material.

When peripheral grooves are cut in the internal walls of hollow cylindrical metal bodies in the manufacture of ball bearing races and similar ring-shaped articles, the fiber structure of the metal in the cut surface is disturbed, and the mechanical strength of the manufactured article is impaired. It is an object of this invention to provide grooves in the internal walls of a hollow cylindrical body without weakening the body. Another object is the formation of a collar on the external wall of such a hollow body without additional expense for material.

It is known to employ rolling devices for achieving the above objects. The known devices, however, are limited in their application to special shapes for which they are specifically designed, they are costly and rather complex. They also tend to deform the metal of a work piece under torsional stress in the direction of the metal surface, whereby the strength of the metal is impaired. It is a more specific object of this invention to provide the afore-mentioned grooves and collars while avoiding the shortcomings of the known devices.

With these and other objects in view, as will hereinafter become apparent, the invention in one of its aspects resides in a device which includes a carrier arranged for rotation about an axis thereof. A cam member which has an axially tapering face about the axis of the carrier is mounted on the same for axial movement, and means are provided for actuating such movement. Several segments are circumferentially offset about the aforementioned tapering face and are formed with respective circumferentially successive grooves which jointly define a track about the axis. The segments are guided radially toward and away from the tapering face. A cage which is movable relative to the segments about the axis is provided for retaining a plurality of rollers in circumferentially spaced relationship and for rotation of the rollers about respective axes radially spaced from the carrier axis while the rollers are in rolling engagement with said track.

The device according to this invention allows to form within hollow cylindrical bodies grooves of different shapes, in the case given together with collars and other embossements on the opposite surface not only without damaging the surface of the material, but with a simultaneous substantial increase in its resistance to stress. As by means of the grooves and other reductions of the thickness of the walls their resistance to stress is by no means decreased, they need not be reinforced and it is not necessary to provide additions of material for forming the collars or other embossements. Substantial savings of material are therefore achieved.

Other objects and advantages of the invention will hereinafter become more fully apparent from the following description of the annexed drawings, which illustrate preferred embodiments, and in which:

FIG. 1 shows a shaping device of the invention engaged in shaping a telescopic piston, the view being in side elevation, and partly in axial section;

FIG. 2 illustrates the shaping device of FIG. 1 in radial section on the line B—B;

FIG. 3 shows a detail of the device of FIG. 1 on a larger scale; and

FIGS. 4 and 5 respectively illustrate shaping tools for use with the device of FIG. 1 in fragmentary side-elevation, and show corresponding portions of work pieces in elevational section.

Referring now to the drawing in detail, and initially to FIG. 1, there is shown a shaping device of the invention in engagement with a work piece 15 which is supported on an anvil 14 in a manner not further illustrated. The work piece is a telescopic piston.

The shaping device, also shown in FIGS. 2 and 3, has a body 1 of generally cylindrical shape about a vertical axis. The tapering upper end of the body 1 is fastened to means, not illustrated in detail, for rotating the body about its axis. A radially projecting flange 8 is fastened to the lower end of the body 1 by a flanged nipple 11. The threads of the nipple 11 engage corresponding threads in an axial bore 20 which extends through the body 1. A rod 4 passes axially through the bore 20 and through the coaxial bore of the nipple 11. The upper projecting end of the rod 4 is secured to means, not shown, for shifting the rod axially in the bore 20. The lower end of the rod 4 carries a disc 7.

The disc is secured against rotation relative to the body 1 by pins 9 which are fastened to the disc 7 in circumferentially spaced relationship, and slidably pass through associated axial guide passages in the flange 8, as is best seen in FIG. 3. The pins 9 are fixedly fastened to a ring 5 whose cylindrical inner face movably engages a corresponding face of the body 1, whereas the outer face conically tapers in an upward direction.

A generally cylindrical sleeve 2 is mounted on the body 1 for rotation about the common axis Y by means of ball bearings 23 which secure the sleeve against axial movement. The lower end of the sleeve 2 carries a cage 3 which is replaceably mounted on the sleeve. Openings in the cage hold two axially spaced sets of four forging rollers 13 which are uniformly spaced about the axis Y in each set, and are free to rotate about their respective axes, and to move radially relative to the axis Y.

Four wedge-shaped segments 6 are radially interposed between the conical outer face of the ring 5 and the cage 3 and are uniformly distributed about the axis Y. The segments 6 are axially secured on the body 1 between a radial wall of the body and the flange 8, and are secured against circumferential movement by projections 19 which movably engage radial slots 18 in the body 1. The segments 6 have approximately cylindrically curved outer faces and inner faces which conformingly engage the outer face of the ring 5.

The segments 6 are urged radially inward into engagement with the ring 5 by two annular springs 10 which are received in corresponding grooves formed in the radial end faces of the segments. When the ring 5 is moved axially upwardly into the position shown in FIG. 3, the camming engagement between the conforming faces of the ring 5 and of the segments 6 causes the segments to move radially outward against the restraint of the springs 10 so that circumferential gaps 22 (FIG. 2) are opened between adjacent segments 6.

Each segment 6 has two axially spaced circumferential grooves 21 in its cylindrical outer face. The grooves are axially aligned to form two circumferential tracks for respective sets of forging rollers 13. The depth of each groove increases from the center of each segment toward the two associated gaps 22. The lower end of the cage 3 is sealed to the flange 8 by two diaphragms 12.

The anvil 14 on which the work piece 15 is fastened is formed with a groove on a common axial level with the forging rollers 13 (FIG. 1, left side).

The afore-described apparatus is operated as follows:

The body 1 which carries the working elements of the shaping device is moved axially into the cavity of the work piece 15 until the rollers 13 are positioned on the level of the groove to be formed. The body 1 is then rotated about its axis, and the rod 4 is progressively pulled axially upward. The forging rollers 13 roll in the grooves 21 and are urged radially outward against the inner wall of the work piece by the camming engagement of the ring 5 with the segments 6 under the pulling force applied to the rod 4. The material displaced by the pressure of the rollers 13 flows into the groove of the anvil 14 to form an integral external collar on the work piece 15.

When grooves are to be formed in tubular bodies of relatively small internal diameter, the ring 5 may be mounted directly on the rod 4.

The shape of the forging rollers is selected according to the contours of the grooves that are to be produced. FIG. 4 shows a forging roller 16 for shaping grooves in a ring 15' intended for a roller or needle bearing. FIG. 5 illustrates a forging roller 17 contoured for shaping an outer race 15" for a ball bearing. The forging rollers of the invention may also be contoured for forming helical grooves, grooves with conical faces, and numerous other shapes.

The shaping device of the invention may be used for forming hollow bodies having cylindrical internal walls and made of any material which is capable of being plastically deformed under applied pressure, as by forging.

I claim:

1. In a shaping device, in combination:
   (a) carrier means having an axis and adapted to rotate about said axis;
   (b) a cam member having an axially tapering face extending about said axis, said member being mounted on said carrier means for axial movement;
   (c) actuating means for actuating said axial movement of said member;
   (d) a plurality of segment members circumferentially offset about said tapering face and formed with respective circumferentially successive grooves, said grooves jointly defining a track about said axis;
   (e) guide means on said carrier means for guiding radial movement of said segment members toward and away from said tapering face;
   (f) a plurality of roller members; and
   (g) cage means movable relative to said segment members about said axis for retaining said roller members in circumferentially spaced relationship while free to move radially relative to said cage means, and for rotation of said roller members about respective axes radially spaced from the axis of said carrier means while said roller members are in rolling engagement with said track.

2. In a device as set forth in claim 1, said carrier means including a body formed with an axial bore therethrough, said actuating means including a rod axially movable in said bore, said cam member being annular about said axis and fixedly connected to said rod for axial movement therewith.

3. In a device as set forth in claim 1, said guide means including means for limiting circumferential and axial movement of said segment members relative to said carrier means.

4. In a device as set forth in claim 3, resilient means permanently urging said segment members in a radially inward direction toward said tapering face.

5. In a device as set forth in claim 1, said cam member being annular, and said tapering face thereof being substantially conical.

6. In a device as set forth in claim 1, each of said grooves having two circumferential end portions and a center portion intermediate said end portions, the depth of the groove increasing from said center portion toward said end portions.

7. In a shaping device in combination:
   (a) a carrier body having an axis and being adapted to rotate about said axis, said body being formed with an axial bore therethrough;
   (b) an annular cam member having a conically tapering face about said axis, said member being mounted on said body for axial movement;
   (c) a rod passing through said axial bore and fixedly connected to said cam member for actuating axial movement of said cam member;
   (d) a plurality of segment members circumferentially offset about said conical face,
      (1) each segment member being formed with a circumferential groove aligned with the grooves of the other segment members to form therewith a circumferential track about said axis,
      (2) each groove varying in depth in a circumferential direction;
   (e) guide means on said carrier body for guiding radial movement of said segment members toward and away from a position of camming engagement with said conical face, and for limiting circumferential and axial movement of said segment members relative to said carrier means;
   (f) yieldably resilient means permanently biasing said segment members in a radially inward direction toward said conical face;
   (g) a cage member rotatable relative to said carrier body about said axis thereof; and
   (h) a plurality of roller members retained by said cage member in circumferentially spaced relationship, said roller members being free to move on said cage member in a radial direction and to rotate about respective axes radially spaced about the axis of said carrier body while said roller members rollingly engage said track.

8. In a device as set forth in claim 7, each of said grooves having two circumferential end portions and a center portion intermediate said end portion, the depth of the groove increasing from said center portion toward said end portions.

References Cited by the Examiner

UNITED STATES PATENTS

| 751,731 | 2/04 | Hill | 72—126 |
| 2,353,288 | 7/44 | Bennewitz | 80—56 |
| 2,375,108 | 5/45 | Hopkins | 80—13 |
| 3,029,668 | 4/62 | Wilman | 80—11 |

FOREIGN PATENTS

| 600,613 | 12/59 | Italy. |
| 1,088,450 | 9/60 | Germany. |
| 422,377 | 1/35 | Great Britain. |

CHARLES W. LANHAM, *Primary Examiner.*

MICHAEL V. BRINDISI, *Examiner.*